Nov. 2, 1937.   D. F. HAMMOND   2,097,661
GASOLINE TANK LOCK
Filed May 25, 1936

Inventor
David F. Hammond
By Linnane and Van Antwerp
Attorneys

Patented Nov. 2, 1937

2,097,661

UNITED STATES PATENT OFFICE 2,097,661

GASOLINE TANK LOCK

David F. Hammond, Grand Rapids, Mich.

Application May 25, 1936, Serial No. 81,660

5 Claims. (Cl. 137—21)

This invention relates to a locking device and more particularly to a locking device for a gasoline supply tank especially for an automobile gasoline tank.

One of the main objects of the present invention is to provide an anti-theft device to prevent the theft of the gasoline supply from an automobile gasoline tank by locking the inlet cap from removal.

Another object of the present invention is to provide an anti-theft device which will prevent the theft of the entire automobile by closing off the gasoline supply to the engine of the automobile and locking the shut-off in that particular position.

Another object of the present invention is to prevent the theft of the gasoline tank cover or cap.

A still further object of the present invention is to provide a lock which is easy to operate and effective in operation and one which will give the foregoing objects and advantages by a single locking mechanism.

Other objects and advantages will become apparent from the following description, taken in connection with the accompanying drawing, in which, Fig. 1 is a vertical longitudinal sectional view through a gasoline supply tank showing my locking mechanism installed therein with the mechanism in locked position.

Figure 3:
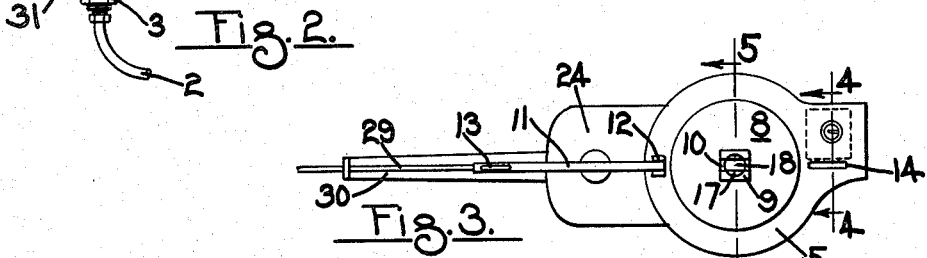
Fig. 3 is a plan view of the locking mechanism removed from the gasoline supply tank.
Figure 4:
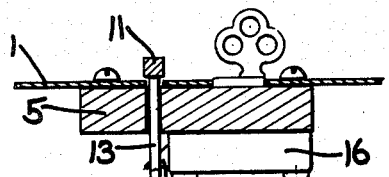
Figure 5:
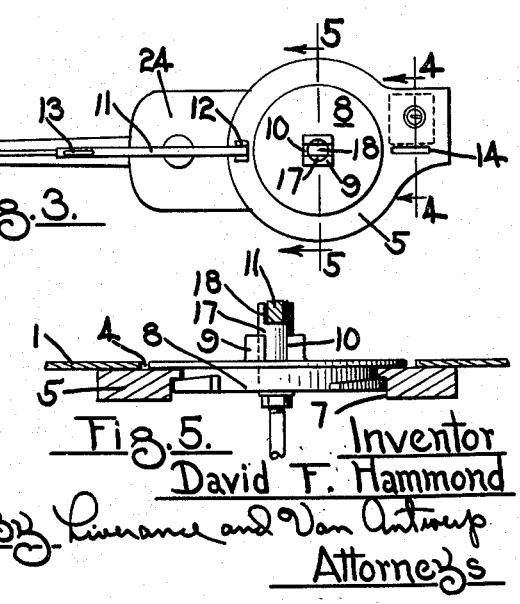

Figs. 4 and 5 are sectional views taken along lines 4—4 and 5—5, respectively, of Fig. 3.

Like reference numerals refer to like parts throughout the several figures of the drawing.

Figure 1:
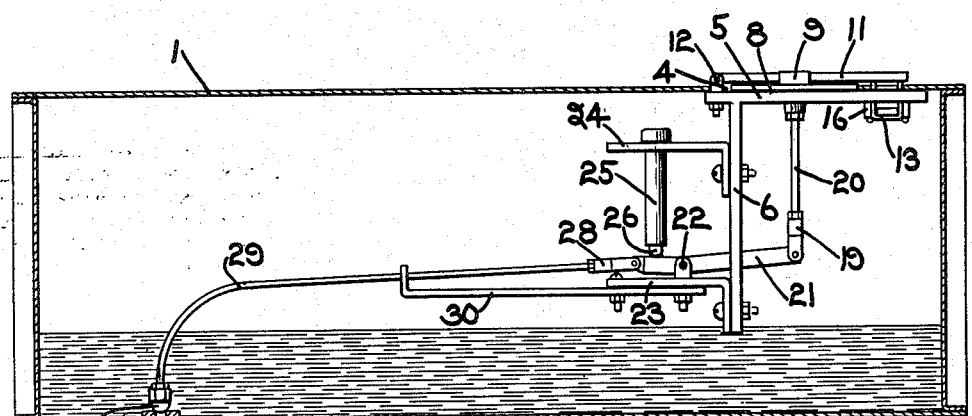
Figure 2:
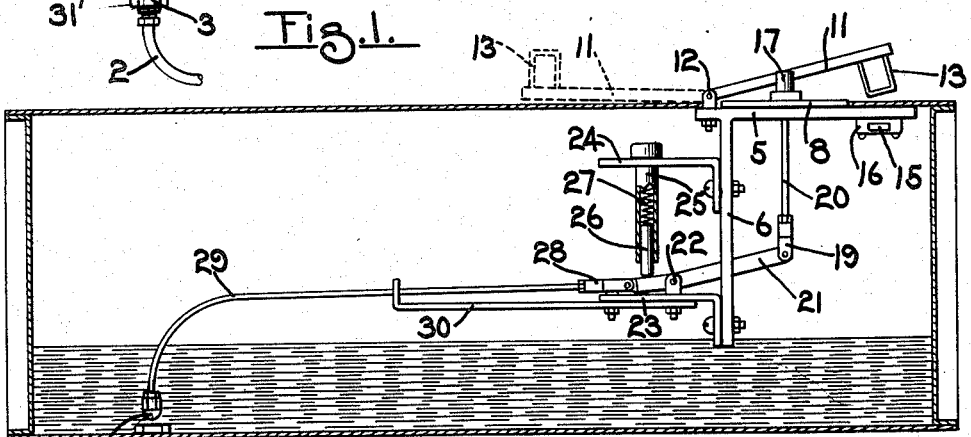
Fig. 2 is a view similar to Fig. 1 showing the locking mechanism in unlocked position, the locking lever being shown in dotted lines in its position when the tank is being filled with gasoline.

As illustrated in Figs. 1 and 2, the numeral 1 indicates a gasoline supply tank of an automobile, an outlet 2 leading therefrom, said outlet leading to the engine of the automobile, the outlet being attached to the gasoline tank by means of the nipple 3.

The top side of the gasoline tank is provided with an opening 4 across which opening is secured the mounting plate 5 on which the locking mechanism is mounted. This mounting plate 5 has a depending portion 6 upon which various parts of the locking mechanism are mounted. A circular opening 7 is provided in the mounting plate through which the gasoline tank is filled with gasoline and to which the cap 8 is secured by means of the bayonet slot construction as shown in Fig. 5. The gasoline tank cap 8 is removed from the opening 7 by giving the cap a quarter turn and lifting it therefrom. The cap 8 has an upwardly extending squared portion 9 through which is formed a central cylindrical opening. This upwardly extending squared portion 9 is grooved at 10 downwardly to the face of the cap. The squared portion 9 is provided so that in instances wherein the cap cannot be rotated to release it a wrench may be applied to the squared portion to facilitate removal of the cap.

A lock lever 11 is pivoted to the mounting plate as indicated at 12, the opposite end of the lever being provided with a downwardly extending yoke 13. When the lock is in locked position the yoke 13 extends downwardly through a slot 14 through the mounting plate and is engaged by the lock bolt 15 of the lock 16. The lock 16 is positioned adjacent the slot 14 and is secured to the bottom of the plate by suitable means, and has a cylindrical portion which extends through the mounting plate and is exposed at the outside of the gasoline tank whereby the lock may be operated by a suitable key.

A plug 17, which is mounted to move vertically in the cylindrical opening formed in the removable gasoline tank cap, is grooved at 18 through its upper end, said groove being cut the same width as the groove 10 which is formed in a squared portion of a cap, these grooved portions 10 and 18 being in alinement when the cap is in attached position. These grooves 10 and 18 are slightly wider than the lock lever 11 whereby the lever 11 may be positioned within these grooves when in locked position which prevents the cap from being rotated and also which pushes the plug 17 to its lowered position and holds it there.

The plug 17 is adjustably connected to a clevis 19 by means of a vertical operating rod 20, this clevis in turn being pivotally connected to an operating bar 21. This operating bar is pivoted at 22 on the bracket 23 which bracket is mounted upon the depending portion 6 of the mounting plate.

Mounted on the depending portion 6 of the mounting plate and above a bracket 23 is the similar bracket 24 on which bracket is mounted a downwardly extending barrel 25. This barrel contains a sliding plunger 26 which is urged downwardly by means of a spring 27 within the barrel. As shown in Fig. 2 this plunger 26 is in alinement with the left-hand end of the operating lever 21, this plunger tending to move this end of the operating bar in a downward direction.

A clevis 28 is pivotally mounted to the left-hand and shorter end of the operating bar 21. This clevis in turn is attached to the valve operating rod 29 which is pivotally and slidably mounted in the supporting bar 30, the supporting bar 30 being mounted on the bracket 23. The outer end of the valve rod is provided with a ball shut-off valve 31 which seats in the nipple 3 when in shut off position.

The operation of the locking mechanism is easily understood, the locking mechanism assuming the position as shown in Fig. 1 when in locked position. When the mechanism is in this locked position the lock lever 11 is held downwardly in horizontal position by means of the yoke 13 being engaged by the lock bolt and when in this horizontal position the lock lever is within the grooved portion 10 of the filler cap thereby preventing rotation and removal of the cap and when in this position the lock lever also lies within the groove of the plug 17 to hold it in a downward position and through the series of levers holds the ball valve 31 against the valve seat formed by the nipple 3.

The locking mechanism assumes the position as shown in Fig. 2 when in unlocked position and while the automobile is being driven. To obtain this position the lock is unlocked by the key means thereby releasing the lock lever whereby the spring pressed plunger 26 operates on the operating bar 21 to bring the parts to the position as shown in Fig. 2, and when in this position the lock bar is removed from the slotted portion of the cap whereby the cap may be rotated and removed and the ball valve 31 is raised from its seat in the nipple 3 whereby the gasoline may flow from the gasoline tank to the engine.

With the mechanism in the position as shown in Fig. 2 the cap may be rotated but in order to lift the cap vertically from the opening the lock lever 11 must be moved to the dotted line position as shown in Fig. 2.

Having thus described my invention it will be seen that I have provided a gasoline supply tank locking mechanism which will prevent theft of the gasoline supply and also prevent theft of the entire automobile by closing off the supply of gasoline to the engine of the automobile and although I have described specific mechanism for obtaining these results it is understood that certain departures may be made without departing from the spirit of the invention. The particular invention, which I desire to secure by Letters Patent, is more fully defined in the appended claims.

I claim:

1. In combination with a gasoline supply tank having a gasoline outlet at its bottom and a filler opening at its top, a mounting plate secured on the inside of the tank adjacent the said filler opening therein, a depending portion extending from one side of the mounting plate, a bracket mounted at the lower end of the said depending portion and extending laterally therefrom, a supporting bar mounted upon the said laterally extending bracket and likewise extending laterally toward the said gasoline outlet, means at the end of the said supporting bar to form a journal, a relatively long rod having valve means thereon immediately above the said outlet, said rod extending through the said journal to a position above the said bracket, pivot means mounted upon the said bracket, an operating bar mounted upon said pivot means, means connecting the adjacent ends of the operating bar and the relatively long valve operating rod, a vertical positioned rod extending through the said mounting plate, means pivotally connecting the lower end of the vertical rod onto the free end of the operating bar, spring means to move the several associated elements so that the outlet valve is normally open, and means located exteriorly of said gasoline supply tank adjacent the said inlet opening and movable to a position against the upper end of the vertically movable operating rod whereby the same may be moved downwardly against the action of said spring means to cause closing of the said valve means.

2. A combination of elements as set forth in claim 1 in which the said inlet opening has a cap associated therewith, said cap having an opening through which the said vertical rod extends, and means cooperatively associated with the upper portion of the said vertical rod and the exterior means whereby rotation of the cap is prevented.

3. An attachment for gasoline tanks comprising, a mounting plate having an inlet opening therethrough and a depending portion thereon, a cap for said inlet opening, laterally extending bracket means on said depending portion, a long flexible rod intermediately pivoted on said bracket having valve means at one end and having its other end above the said bracket, a vertically movable rod movable through the central opening of the cap, means connecting the lower end of the said vertical rod and the other end of the relatively long operating rod whereby movement of the former in a downward direction causes upward movement of the latter for the purpose described, and means pivoted on the mounting plate adjacent the opening therein for association with the upper end of the vertically movable rod to prevent its upward actuation for the purpose described.

4. An attachment of the class described for a gasoline supply tank, having an inlet and outlet opening therein, comprising, a mounting plate having an opening therethrough, a gasoline supply tank cap receivable in said opening, said cap having a central opening therein, a vertically operating rod extending through said opening in the said cap, means rigid with the said mounting plate and extending downwardly therefrom, a series of levers pivoted upon the said depending means, a valve, means including the series of levers, interconnecting the valve and the operating rod so that downward movement of the rod causes downward movement of the said valve, spring means for normally urging one of said levers in such a direction as to cause the valve to move upwardly, and means for moving the said operating vertical rod downwardly.

5. An attachment for a gasoline tank comprising a unit structure consisting of a mounting plate having depending means and upwardly extending means thereon, said upwardly extending means having a locking lever pivotally attached thereto, said mounting plate also having an opening therein, a perforated cap rotatable to locked position within the said opening, a vertically movable rod extending through said opening in the cap, said locking lever being cooperatively associated with said vertically movable rod to prevent rotation thereof and also vertical movement, a valve, means for mounting the valve, and means connecting the last mentioned means and the lower end of said vertically movable rod whereby movement of the said rod downwardly causes downward movement of the said valve means for the purpose described.

DAVID F. HAMMOND.